(12) United States Patent
Doyen et al.

(10) Patent No.: US 8,993,081 B2
(45) Date of Patent: Mar. 31, 2015

(54) KNITTED SUPPORT FOR TUBULAR MEMBRANES

(75) Inventors: Wim Doyen, Wommelgem (BE); Marc Verbeke, Izegem (BE); Herman Beckers, Scherpenheuvel-Zichem (BE); Bart Molenberghs, Mol (BE); Rob Muyshondt, Hamont-Achel (BE)

(73) Assignee: Vlaamse Instelling Voor Technologish Onderzoek N.V. (VITO), Mol (BE)

( * ) Notice: Subject to any disclaimer, the term of this patent is extended or adjusted under 35 U.S.C. 154(b) by 1261 days.

(21) Appl. No.: 12/296,741

(22) PCT Filed: Apr. 10, 2007

(86) PCT No.: PCT/EP2007/053482
§ 371 (c)(1),
(2), (4) Date: May 26, 2009

(87) PCT Pub. No.: WO2007/116072
PCT Pub. Date: Oct. 18, 2007

(65) Prior Publication Data
US 2009/0304963 A1 Dec. 10, 2009

(30) Foreign Application Priority Data

Apr. 10, 2006 (EP) .................................... 06112446

(51) Int. Cl.
*B32B 5/18* (2006.01)
*B32B 5/22* (2006.01)
(Continued)

(52) U.S. Cl.
CPC ............ *B01D 67/0013* (2013.01); *B01D 69/04* (2013.01); *B01D 69/084* (2013.01);
(Continued)

(58) Field of Classification Search
CPC .............. D04B 1/16; D04B 9/44; D04B 1/22; D04B 1/225; D06B 3/105; B01D 67/0002; B01D 69/04–69/10; A61F 2/01; A61F 2/013
See application file for complete search history.

(56) References Cited

U.S. PATENT DOCUMENTS

| 3,337,673 A | 8/1967 | Jeckel |
| 3,563,889 A | 2/1971 | Cooper et al. |

(Continued)

FOREIGN PATENT DOCUMENTS

| JP | 04-355117 | 9/1992 |
| WO | WO 2005/061081 A1 | 7/2005 |

OTHER PUBLICATIONS

Truno, Ruben Ultrastructural Analyses of Blood-Interfacing Linings Formed Within Partial Artificial Hearts or Abdominal Left Ventricular Assist Devices: A Qualitative Scheme for Human Pseudoneointimal Accretion Kinetics, Cardiovascular Disease, Bulletin of the Texas Heart Institute, vol. 6, No. 2, Jun. 1979.

*Primary Examiner* — Rena L Dye
*Assistant Examiner* — Brett A Crouse
(74) *Attorney, Agent, or Firm* — Merchant & Gould P.C.

(57) ABSTRACT

A method of manufacturing a reinforced tubular membrane comprises the steps of manufacturing the tubular support from monofilament thread, impregnating the support with membrane dope and adjusting the inner and the outer diameter of the membrane. A coating apparatus comprises a casting bob and an orifice to adjust respectively the inner and outer diameter of the membrane. A tubular reinforced polymeric membrane comprises a tubular support and membrane substance. The tubular support is made of monofilament thread and has a sufficiently open structure (openings larger than 0.1 mm). Touching and/or engaging parts of the thread may be linked prior to impregnating the support with membrane dope. The support may comprise loops of the monofilament thread, which are also linked.

21 Claims, 15 Drawing Sheets

(51) Int. Cl.
*B01D 67/00* (2006.01)
*B01D 69/04* (2006.01)
*B01D 69/08* (2006.01)
*B01D 69/10* (2006.01)
*D04B 1/16* (2006.01)
*D04B 9/44* (2006.01)
*D06B 3/10* (2006.01)

(52) U.S. Cl.
CPC ................ *B01D 69/10* (2013.01); *D04B 1/16* (2013.01); *D04B 9/44* (2013.01); *D06B 3/105* (2013.01); *B01D 2323/42* (2013.01); *B01D 2325/24* (2013.01); *B01D 2325/40* (2013.01)
USPC ................................ 428/36.1; 442/76; 442/77

(56) References Cited

U.S. PATENT DOCUMENTS

| | | | |
|---|---|---|---|
| 3,676,193 | A | 7/1972 | Cooper et al. |
| 4,061,821 | A | 12/1977 | Hayano et al. |
| 4,194,942 | A | 3/1980 | Tanaka |
| 4,346,126 | A | 8/1982 | Kutowy et al. |
| 5,185,408 | A * | 2/1993 | Tang et al. ............... 525/415 |
| RE39,176 | E * | 7/2006 | Dutt ........................ 442/43 |
| 7,323,001 | B2 * | 1/2008 | Clubb et al. ............... 606/200 |
| 8,529,814 | B2 * | 9/2013 | Palinkas et al. ........... 264/177.14 |
| 2003/0204168 | A1 * | 10/2003 | Bosma et al. ............. 604/103.02 |

* cited by examiner

US 8,993,081 B2

KNITTED SUPPORT FOR TUBULAR MEMBRANES

This application is a National Stage Application of PCT/EP2007/053482, filed Apr. 10, 2007, which claims benefit of Serial No. 06112446.7, filed Apr. 10, 2006 in EPO and which application(s) are incorporated herein by reference. To the extent appropriate, a claim of priority is made to each of the above disclosed applications.

FIELD OF THE INVENTION

The present invention is related to reinforced tubular both inside to outside (i/o) and outside to inside (o/i) polymeric filtration membranes and to methods of producing them. Particularly, the present invention is related to tubular polymeric membranes comprising a reinforcing support which is embedded in the membrane. The membrane material of a polymeric membrane is a polymer compound. The present invention does not envisage ceramic membranes.

STATE OF THE ART

It is known in the art to reinforce tubular polymeric membranes for use as either inside to outside (i/o), or outside to inside (o/i) membranes. The use of the membrane determines at which side of the tubular membrane (inside or outside) a backing or reinforcing support is provided. The reinforcing support typically comprises a dense layer in which the membrane dope (the solution, that is cast or coated) only partially permeates, leading to a poor adhesion between the reinforcing support and the membrane substance.

As a result, all supported tubular i/o membranes can withstand significant i/o-trans-membrane-pressures (TMP) upon filtration, but suffer from poor o/i-TMP upon backwashing, as the membrane is prone to collapse, resulting in permanent membrane damage. A backwash trans-membrane-pressure is a pressure applied in a reverse direction across the membrane than the TMP for filtration (normal operation). By backwashing, fouling substances which adhere to the membrane are removed. An analogous situation exists with capillary outside to inside (o/i) polymeric filtration membranes, which suffer from a poor i/o TMP upon backwashing, because the membrane is prone to detaching from the support and may eventually explode when the backwash TMP is too high.

Hence, existing tubular polymeric membranes do not enable to exploit their full potential in long term semi dead-end operation, where there is a need of backwashing often. Major problems of existing tubular polymeric membranes are:
  limited membrane adhesion in all types of tubular membranes (both i/o and o/i membranes), resulting in membrane damage when backwash TMPs are higher than 1 bar with liquid and 0.7 bar with gas;
  most tubular woven and non-woven supports are welded and there is no membrane penetration into the seam of the weld; therefore the membrane easily detaches from the tubular support at the welds;
  collapse of tubular support of i/o membranes upon backwashing at higher TMPs.

A tubular support that improves on the supports discussed above is known from WO 2005/061081, which discloses a crochet process for the manufacture of a tubular membrane support from multifilament fibres. Longitudinal and transverse threads are tied together at a number of distinct spots, improving the stability of the support. However, the cross-section of the resulting support is not circular, but a polygon. Moreover, the use of multifilament fibres results in a tubular support structure having lower rigidity than a monofilament structure: this type of support may therefore be more prone to collapsing.

It is known from U.S. Pat. No. 4,061,821 to impregnate a tubular braided or knit cord with a membrane dope in order to obtain a tubular membrane wherein the cord is fully embedded in the membrane. The disclosed method of manufacturing however, does not allow for precise control of the inner diameter of the membrane under all circumstances, particularly in the case in which the cord is fully impregnated with membrane dope.

AIMS OF THE INVENTION

In the state of the art there is a need of low-cost tubular polymeric filtration membranes which are able to withstand high backwash TMPs and which eventually may be used as both inside to outside and outside to inside filtration membranes. Such membranes may find large market applications, such as in membrane bioreactors (MBR).

The present invention hence aims to provide a reinforced tubular polymeric membrane with improved mechanical strength and improved backwashing properties, which overcomes the drawbacks of the prior art. An object of the invention is to provide and manufacture an improved or at least an alternative tubular polymeric membrane comprising a reinforcing support which can be impregnated by the membrane dope and which is permeable for the membrane dope. This should allow for backwashing the membrane at much higher backwash TMPs than 1 bar and eventually at backwash TMPs on the order of the filtration TMP.

The present invention also aims to provide an improved or at least an alternative method of producing a reinforced tubular polymeric membrane and an improved apparatus for manufacturing such a membrane. The present invention equally aims to provide a method of manufacturing such membrane, which overcomes the drawbacks of the prior art.

SUMMARY OF THE INVENTION

Circularly shaped, hollow filtration membranes come in a wide range of dimensions. Such membranes having an internal diameter in the range between 0.5 mm and 2.5 mm are generally referred to as capillary membranes. Membranes having an internal diameter larger than 2-2.5 mm are generally referred to as tubular membranes. The present invention is related to both capillary and tubular reinforced polymeric filtration membranes, as set out in the appended claims. The membranes envisaged by the invention have an internal diameter in the range between about 1 mm and 25 mm. Wherever in the following the term "tubular membrane" is used, this should be interpreted as also comprising capillary membranes. The present invention is equally related to a method of manufacturing reinforced tubular polymeric membranes, as set out in the appended claims and to a coating apparatus for coating the reinforcing support with the membrane.

According to one aspect of the invention, there is provided a method of producing a reinforced tubular polymeric membrane, comprising the steps of: manufacturing a seamless porous tubular support from monofilament thread, impregnating the tubular support with a polymeric solution to obtain an impregnated tubular support, adjusting the inner diameter of the impregnated tubular support, adjusting the outer diameter of the impregnated tubular support and immersing the impregnated tubular support in a precipitation bath to obtain a reinforced membrane. In the impregnating step, the polymeric solution is fed from the outside of the support. The inner lumen of the tubular support at least partially fills with the polymeric solution. The polymeric solution is a membrane dope yielding a solid, porous membrane substance after precipitation or coagulation. The precipitation bath is a bath in which the polymeric solution coagulates.

Preferably, the step of adjusting the inner diameter comprises passing the impregnated tubular support along a casting bob. Preferably, the step of adjusting the outer diameter comprises passing the impregnated tubular support through an orifice.

Preferably, in the manufacturing step, the seamless porous tubular support comprises through-openings having a size larger than or equal to 0.1 mm. More preferably, the through-openings have a size in the range between 0.1 mm and 10 mm. Even more preferably, the through-openings have a size in the range between 0.2 mm and 5 mm. Through-openings are openings or pores which extend completely through the wall of the tubular support, from the outer side to the inner lumen.

Preferably, the method according to the invention comprises the step of cutting the impregnated tubular support while it is immersed in the precipitation bath.

Preferably, the impregnating step is performed in a coating device and the tubular support is pushed through the coating device.

Preferably, the manufacturing step comprises linking parts of said monofilament thread which engage and/or touch. The linking step fixates said parts of the monofilament thread. More preferably, the step of linking parts of the monofilament thread comprises thermo-fixating said parts. Equally preferably, the step of linking parts of the monofilament thread comprises coating the support with a resin and curing or hardening said resin. The resin may be a UV-curable resin which is UV-cured after coating the support. The resin may also comprise a hardening accelerator. Preferably, in the step of hardening the resin, the resin is hardened within 60 seconds after coating the support.

Preferably, the method according to the invention comprises, prior to the impregnating step, the step of inserting a pre-formed spiral thread into the tubular support and linking said spiral thread to the tubular support.

Preferably, in the impregnating step the polymeric solution has a viscosity in the range between 0.5 Pa.s and 500 Pa.s. Preferably, in the impregnating step the polymeric solution has a total polymeric content higher than or equal to 25%.

According to a second aspect of the invention, there is provided a device for impregnating a hollow cord with a polymeric solution. The device of the invention comprises a coating head, comprising a cord inlet, an inlet for the polymeric solution and an outlet. The device furthermore comprises guiding means for guiding the cord into the coating head, which are provided at the cord inlet. The outlet comprises an orifice and a casting bob, so that when the hollow cord passes through the device, the casting bob is arranged to be located inside the inner lumen of the hollow cord.

Preferably, said guiding means comprise a tube. Said tube is provided at the cord inlet. Said tube preferably extends into the coating head and preferably comprises perforations in the coating head. Preferably, the tube is of cylindrical or conical shape.

According to a third aspect of the invention, there is provided a tubular polymeric membrane comprising a tubular support and a membrane substance. The tubular support is seamless, comprises monofilament thread and comprises through-openings. The tubular support is embedded in the membrane substance and the membrane substance is present both at the inner and the outer wall of the tubular support and fills said through-openings.

Preferably, the through-openings have a size larger than or equal to 0.1 mm. More preferably, the through-openings have a size in the range between 0.1 mm and 10 mm. Even more preferably, the through-openings have a size in the range between 0.2 mm and 5 mm.

Preferably, parts of the monofilament thread that engage and/or touch are linked by other means than the membrane substance and in addition to the membrane substance. More preferably, said parts of the monofilament thread that engage and/or touch are linked by cured or hardened resin. Even more preferably, said tubular support comprises loops of monofilament thread and adjacent and/or engaging loops are linked. Said tubular support is preferably knit or crocheted.

Preferably, said monofilament thread is selected from the group consisting of polyester, polyamide, polyethylene, polypropylene, polyetherketone, polyetheretherketone and polyphenylenesulfide.

Preferably, the tubular reinforced membrane according to the invention has an outer diameter equal to the outer diameter of the tubular support.

Preferably, the tubular reinforced membrane according to the invention has an inner diameter equal to the inner diameter of the tubular support.

Preferably, the tubular reinforced membrane according to the invention comprises a spiral thread inside of the tubular support, which is embedded in the membrane substance.

BRIEF DESCRIPTION OF THE DRAWINGS

FIG. 2b represents a close-up of the upper part of the needle of FIG. 2a.

DETAILED DESCRIPTION OF THE INVENTION

Figure 1:
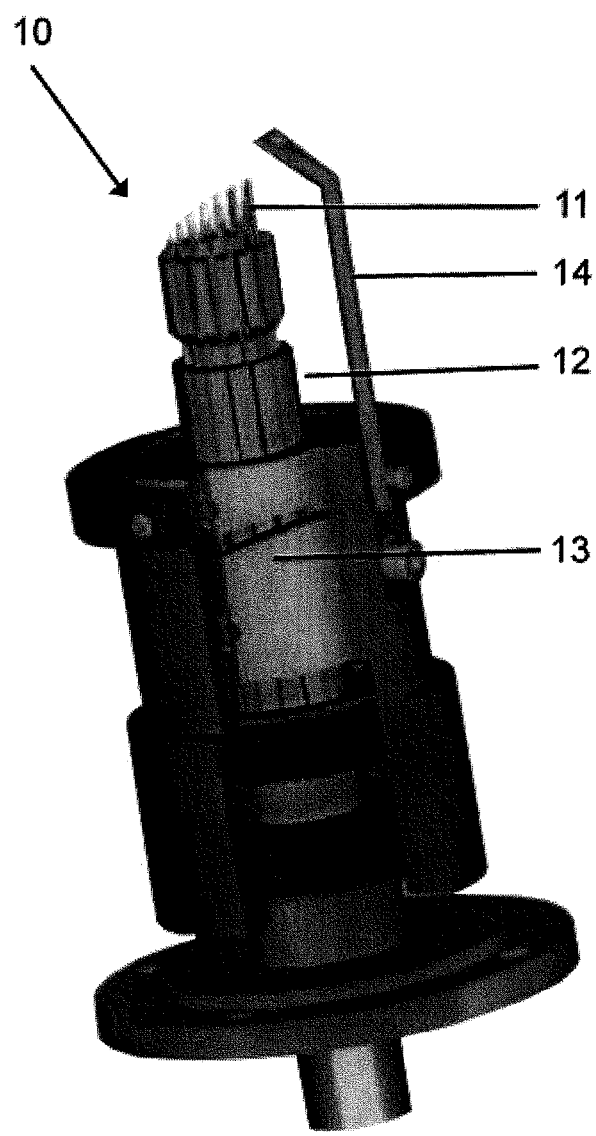
FIG. 1 represents the core unit of a knitting machine.

The reinforced tubular polymeric membranes of the prior art show already a satisfactory resistance against TMP in one direction—either i/o or o/i—but when the membrane is backwashed a number of problems arise which limit the maximally applicable backwash TMP (reverse TMP). One possible problem is collapsing of the membrane tube, which makes the membrane not suitable for use. Another problem may be that the membrane substance (the filtrating, porous membrane material) detaches from the support and is damaged irrecoverably. Innovating in the present invention is a new, much more rigid support for the membrane and a method of anchoring the membrane substance to the new support, wherein the support gets embedded within the membrane substance and the membrane substance gets distributed within the structure of the support, which make that the membrane adheres more strongly to the support and that the support shows a high resistance against collapsing and exploding. As a result, the reinforced tubular polymeric membranes of the invention have maximal i/o TMP and o/i TMP which are almost equal. Hence the same membrane may be employed both in i/o and in o/i applications, without any limitation of applicable backwash TMP.

In order to achieve the above goals, a method is provided for manufacturing a reinforced tubular polymeric membrane. In a first part of the method, a sufficiently rigid tubular support which reinforces the polymeric membrane is manufactured. The tubular support is a porous, hollow cord. Optional steps may be provided for reinforcing the support. In a following part of the method of the invention, the support is impregnated (coated) with a polymeric solution (membrane dope), and the inner and outer diameters of the membrane are adjusted. Finally, the membrane is immersed in a precipitation bath where the membrane dope coagulates to form a membrane substance. The membrane may optionally be cut into tubes of desired length.

The method of the invention allows to adjust and to control both the internal and external diameter of the membrane, so as to obtain a membrane with smooth inner and outer walls, wherein the support may be completely embedded in the polymeric membrane substance.

Hence, in a first step, a seamless tubular support is manufactured from monofilament thread. Techniques known in the art for the manufacture of fabrics, cloths, etc. in a circular, seamless shape, such as knitting, braiding, crocheting or weaving, may be used for manufacturing the support. The manufacturing method of the support results in a hollow cord having an open structure, i.e. a hollow, porous cord. The openings (or pores) extend completely through the wall thickness of the cord, they are hence through-openings. The openings should be sufficiently large in size to allow the membrane dope to impregnate the cord. The cord is preferably of circular cross-section. The manufacturing of the support (the cord) results in a seamless cord and welding operations for mating the support tubular or hollow are not used. For the purposes of the present invention, seamless means without comprising a weld seam.

Suitable monofilament materials are polyester, polyamide, polyethylene, polypropylene, polyetherketone (PEK), polyetheretherketone (PEEK) and polyphenylenesulfide monofilament threads. These threads are preferably pre-shrunk before being used in the cord manufacturing process. Pre-shrinking the monofilament thread allows to considerably reduce the shrinkage and enhance the stiffness of the tubular cord. At the end of this text an embodiment of the step of manufacturing the support is described in more detail (a knitting method).

After manufacturing, the cord may be wound on a spool for transportation. This eases handling when the cord is not coated with membrane at the same facility or location.

In an optional step, a spiral thread may be inserted within the cord to improve the resistance of larger diameter cords against pleating of the cord (to improve collapse resistance of the tubular membrane). The spiral thread may be manufactured in advance and inserted in the cord during the cord manufacturing process.

In a preferred embodiment of the membrane manufacturing method, in order to further improve the collapse (pleating) resistance of the hollow cord, after the step of manufacturing of the cord, engaging parts of the thread are linked or adjacent and/or engaging loops are linked. This may be performed by applying a heat fixation step or by applying a fast-hardening resin. In the case of a spiral thread within the hollow cord, the present method step allows for linking the spiral thread to the cord.

A heat fixation (or thermo-fixation) is performed by means of heat and may be performed on the same machine that produces the cord. During the heat fixation, engaging/touching parts of the thread melt and are merged a little, thereby forming a link. It is important that during the fixation the open structure of the fabric is not completely closed off, otherwise the permeability of the support is lost. Maximal heat fixation temperature may be about 200° C.; to fixate a monofilament cord a temperature of about 120° C. to 180° C. may be preferably used, depending on the fibre material. The thermo-fixation step reduces the elasticity of the cord, improves its rigidity and prevents the cord from fraying.

Figure 11:
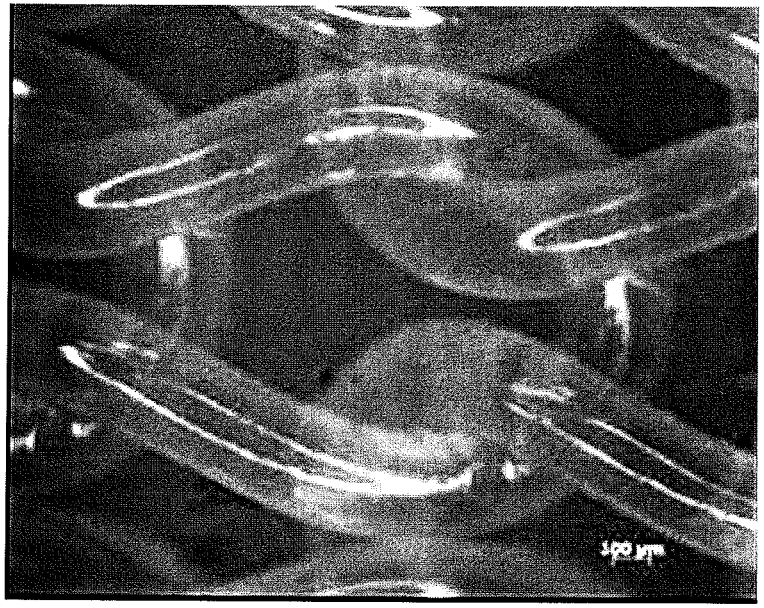
FIG. 11 shows a portion of a knit monofilament cord.
Figure 12:
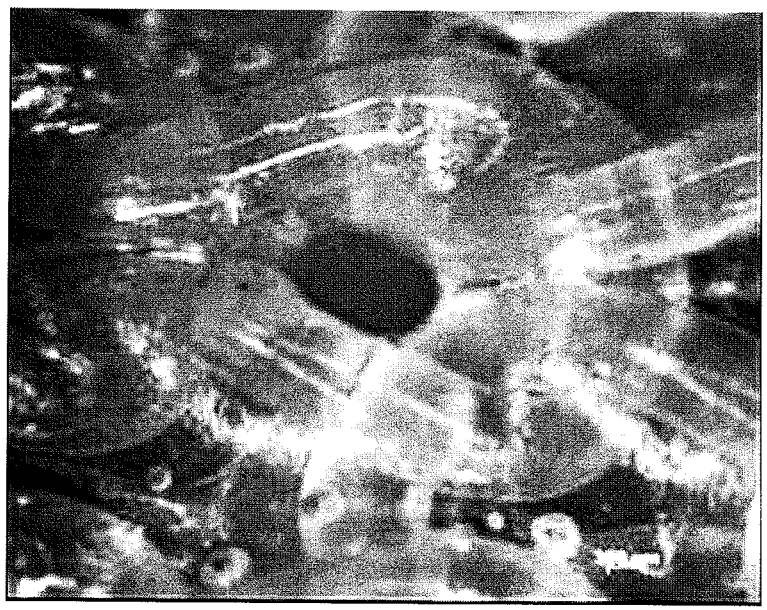
FIG. 12 shows the portion of cord of FIG. 11, coated with cured resin for linking the loops.

Linking may equally well be performed by coating the manufactured tubular cord with a hardening resin, preferably a fast-hardening resin. This may be a UV-curable resin (e.g. epoxy) or a resin with a hardening accelerator (e.g. two-component epoxy or polyurethane resin with hardening accelerators). The coating on the cord is thereafter allowed to harden or cure (e.g. by passing the cord underneath a UV-lamp). The resin fixates parts of touching or engaging thread (e.g. loops). By so doing, parts of the monofilament are fixated and can not displace relative to each other any more. As a result a non-compressible porous tubular support is obtained. FIGS. 11 and 12 show a detail of a knit monofilament cord respectively before and after the linking step (a fast-hardening resin has been used in the FIG. 12). As may be seen from FIG. 12, the openness of the structure of the cord in FIG. 11 is only partially lost.

The fast-hardening resin may be coated after the step of manufacturing the cord, and prior to the step of coating/impregnating the cord with membrane dope. In a preferred embodiment, the cord is manufactured and wound on a spool. Thereafter, at the manufacturing facility of the membrane, the cord is unwound from the spool, coated with resin and the resin is hardened or cured before the step of coating the cord with membrane dope.

In a following step, the tubular support is impregnated with membrane dope. Therefore, the support is passed through a coating device of the invention. Compared to prior art coating devices, the coating device of the invention allows to fully impregnate the support with membrane dope and to obtain a tubular membrane with controlled inner and outer diameters.

Figure 13:
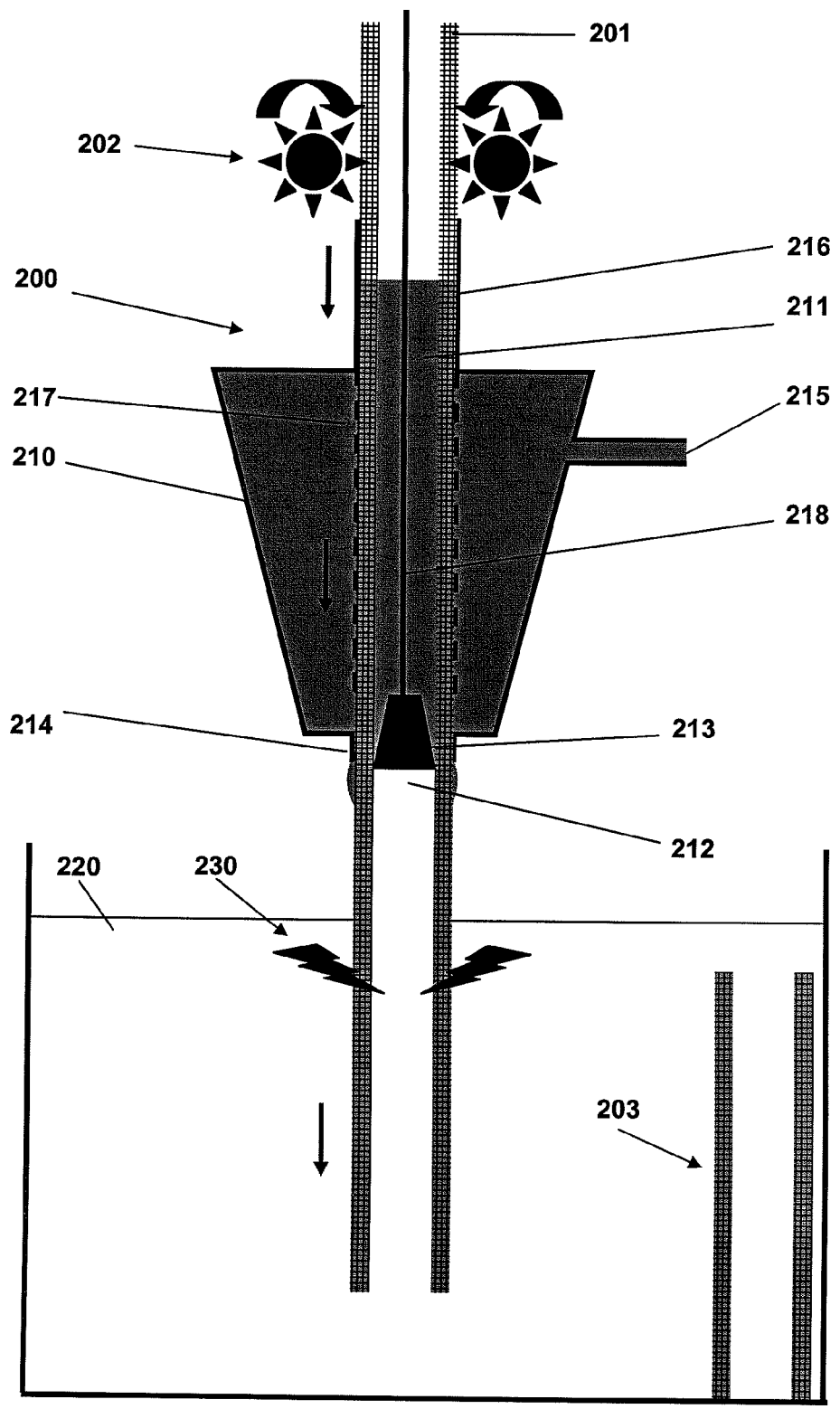
FIG. 13 represents the device for coating/impregnating a hollow cord with membrane dope according to the invention.

FIG. 13 shows a preferred embodiment 200 of the coating device of the invention. The coating device comprises a coating head 210. Coating head 210 comprises an inlet 211 and outlet 212 for a hollow cord 201 and a feed 215 for the membrane dope. Hollow cord 201 is fed continuously to coating device 200. Cord 201 will constitute the support of a tubular membrane. At the inlet 211 for the hollow cord there is provided a tube 216 for guiding the cord 201 through the coating device. Tube 216 may be of cylindrical or conical shape (i.e. the internal diameter decreasing in the cord feeding direction). In a preferred embodiment, tube 216 extends into the coating head 210, whereby tube 216 is provided with perforations 217 for passing the membrane dope. The function of the perforations 217 is to remove air upon start up and to impregnate and completely fill up the cord with dope. The membrane dope, which is a liquid polymeric solution, is fed by a metering pump to feed point 215 and fills the coating head 210. The membrane dope passes through the perforations 217 of tube 216 and impregnates the cord. The inner lumen of the cord 201 gets completely filled with membrane dope. The tube 216 may end a short distance upstream of the outlet 212 of the coating head. The amount of dope is metered in function of the level of the dope within the coating device (level at inlet 211).

Hence, the cord 201, after exiting tube 216, arrives at the outlet 212 of coating device 200. At the outlet, the internal and the external diameters of the eventual membrane are adjusted. Therefore, outlet 212 comprises an orifice 214 and a casting bob 213. Orifice 214 determines the eventual outer diameter of the manufactured tubular membrane 203. Casting bob 213 determines the eventual inner diameter of the tubular membrane 203.

The inner diameter of the membrane is adjusted by letting cord 201, which at this stage is impregnated and completely filled up with dope, pass at the outside of casting bob 213. Casting bob 213 is located in the inner lumen of the cord. Hence, the outer diameter of casting bob 213 controls (adjusts) the inner diameter of the membrane. The casting bob may be kept in place by a bar or a rope 218, which may be arranged either upstream or downstream the casting bob, or kept in place magnetically. The outer diameter of the membrane is adjusted by letting cord 201 pass through orifice 214. Hence, the diameter of orifice 214 controls (adjusts) the outer diameter of the membrane. The casting bob 213 and the orifice 214 may or may not be displaced with reference to each other in direction of the stream (e.g. they may be positioned at the same height in FIG. 13). The coating device 200 allows for obtaining a tubular polymeric membrane with smooth walls and constant and reproducible inner and outer diameters.

The cord 201 may either be pulled through the coating device, as is common practice in the prior art, or it may be pushed through the coating device. Pushing of the cord through the coating device may be advantageous when the impregnated cord is cut to desired lengths and is not wound on a spool. In the embodiment of FIG. 13, cord 201 is pushed through coating device 200 by means of driving wheels 202. Wheels 202 may be provided with pins which engage in the openings of the cord 201 and hence push the cord through the coating device 200. Wheels 202 may also be made of rubber exerting a high friction force on the cord for feeding the cord. It is to be noted that the ability to push the cord through the coating device is made possible by the guidance provided by tube 216. Tube 216 cares for guiding the cord 201 from the inlet of the coating device to the outlet. Cord feed rates through the coating device 200 lie preferably in the range between 1 and 10 meters/minute.

According to a preferred embodiment, either one or both the casting bob and the orifice have dimensions equal to respectively the inner and outer diameter of the tubular support (the cord). Hence, a membrane may be obtained having either one or both inner and outer diameters equal to respectively the inner and outer diameter of its support. Such a membrane still has its support fully impregnated with membrane dope, i.e. the membrane dope is present both at the inside wall and at the outside wall of the support.

After the membrane impregnated cord exits the coating device by outlet 212, it is immersed in a precipitation bath 220, in which the membrane dope coagulates to form a porous, solid membrane substance. Precipitation bath 220 may comprise a coagulating agent for the membrane dope. For coagulation, the bath may comprise a non-solvent of the membrane dope polymer(s), or a mixture of a solvent and a non-solvent. The membrane formation step may be performed according to methods known in the art.

The membrane dope used is a viscous solution comprising one or more polymers, an organic solvent for the polymer(s) being used, and a hydrophilic compound. Preferred viscosity of the solution ranges between 0.5 Pa.s and 500 Pa.s. These ranges are higher than what is common in the prior art. The viscosity of the dope solution may be adapted in function of the type of tubular support (size of openings, monofilament diameter, etc.). In order to allow a full impregnation of the cord with membrane dope at the suggested feed rates, it is preferable that the through-openings of the cord are larger than 0.1 mm in size. The polymer(s) may be one or more of the following: polyethersulphone (PES), polyvinylpyrrolidone (PVP), polysulphone, polyacrylonitrile, polyvinylalcohol, polyvinylacetate and polyvinylchloride. The solvent may be N-methylpyrrolidone (NMP). The total polymer concentration of the membrane dope solution is preferably 25% or higher. The precipitation bath 220 hence may comprise a mixture of water (as non-solvent of the dope polymers) and NMP.

In an optional, subsequent step of the method of the invention, the membrane is cut into tubes of desired length. This may be performed after passing the membrane through the precipitation bath. Alternatively, the cutting step may equally well be performed while the membrane is immersed in the precipitation bath 200, as shown in FIG. 13. Therefore, in the precipitation bath 220, underneath the bath liquid level, two guillotine type knives 230 may be provided to cut the membrane. The membrane may be cut while the dope is coagulating. Preferably, two knives are used in order to avoid displacement of the membrane. Once the membranes 203 are cut to size, they are put aside within the precipitation bath 220 and the dope is allowed to further coagulate. The membranes may be cut in lengths exceeding three meters.

Subsequently, the membrane may be washed out of solvent, non solvents and water soluble dope additives and dried.

By way of example, for an i/o membrane with asymmetric pore size distribution having a dense structure on the inside (small pores), and less dense structure on the outside (larger pores), the membrane formation step may be performed in such a way that the internal layer of the membrane is formed by immersion precipitation in a precipitation bath (water or other non-solvents of the dope, or mixture of solvent and non-solvent), and the external layer of the membrane may be formed by a controlled water vapour contact (e.g. before immersion in the bath), preferably having a temperature in the range between 40° C. and 80° C.

The manufacturing method of the invention allows for manufacturing superior, reinforced tubular polymeric membranes at relatively low-cost and with high throughput.

The invention also provides a reinforced tubular polymeric membrane, which can be produced by the method of the invention and which has improved mechanical properties over polymeric membranes of the prior art. Two aspects are important in the membrane of the invention: a rigid support of high mechanical strength and a strong anchoring of the membrane substance to the support.

Having regard to the first aspect, the support of the reinforced tubular polymeric membrane of the invention is a hollow cord made of monofilament thread. The cord is preferably of circular cross-section. Monofilament thread has a higher rigidity than multifilament thread of equal diameter. The cord is preferably of a woven, knit, braided, crocheted type, or manufactured by any other similar technique which allows for obtaining a seamless hollow cord. The support (the cord) hence does not comprise a weld seam.

According to a preferred embodiment, the cord is knit or crocheted, whereby parts of the monofilament thread form loops (such as the stitches in a knit cord), which engage with other loops or parts of the thread to form a fabric. The above-mentioned cords already show a high explosion resistance (resistance against i/o TMP), but the collapsing resistance (resistance against o/i TMP) of the cord in some cases may not be sufficient. The resistance against collapsing may be improved by employing larger diameter monofilament threads for manufacturing the cord.

An alternative solution that is put forward by the present invention is to link adjacent and/or engaging loops (e.g. in case of knit or crocheted cord) or engaging parts of the thread (e.g. in case of woven cord). Linking of the loops or engaging thread parts may be performed by thermo-fixation, or by applying on the support a fast-hardening (e.g. a UV-curable or thermo-hardening) resin. The links prevent that the loops or thread parts move relative to each other and give the support an improved rigidity. The linking of loops or thread parts may be performed additionally to the use of larger diameter monofilament thread to give the cord increased mechanical strength.

An additional important aspect of the tubular support of the present invention is the anchoring of the membrane substance to the support. A good anchorage of the membrane substance to the cord may be achieved by a providing rough and open-structured support.

Firstly, the structure of the tubular support is porous, preferably shows a certain degree of roughness and preferably comprises a high degree of tortuosity of the monofilament thread. A rough support structure allows for sufficient anchorage points for the membrane substance, which contribute to the adhesion strength of the membrane substance to the support and increase the pressure resistance of the tubular membrane.

Secondly, the structure of the tubular support (cord) of the invention is preferably sufficiently open (porous) and comprises through-openings which extend across the wall of the support. This allows a good permeability of the membrane dope into the support. Hence, the membrane substance is present within the structure of the support and embeds the support. The membrane substance may in addition be present at the outer side of the support and/or at the inner side of the tubular support. The support comprises through-openings which are sufficiently large. Furthermore, when the openings (the pores) in the support are larger, this results in a larger area of the wall available for filtration. On the other hand, the openings in the support structure may not be too large, as larger distances are more difficult to be bridged by the membrane substance. Preferably, the through-openings (pores) of the support have a size larger than or equal to 0.1 mm and more preferably between 0.1 mm and 10 mm. Most preferably the through-openings have a size in the range between 0.2 mm and 5 mm.

Obtaining a rigid, though open tubular support may necessitate an appropriate choice of the size of monofilament thread for the support and caution should be exerted when linking or fixating the thread parts or loops of the support. These links may not entirely close off the openings (pores) of the fabric.

Additionally, tubular large-diameter supports may be provided with a spiral thread inserted into the hollow cord, in order to further improve collapse resistance. This spiral thread functions within the cord as a kind of spring, preventing the cord from pleating. The spring thread has preferably a larger diameter than the thread of the fabric and is preferably a monofilament thread, selected from the same group of materials as the threads used for the fabric of the cord. Alternatively, the spring thread can be made of metal. The spring may be linked to the tubular cord by thermo-fixation, or application of a fast-hardening coating.

The support is embedded in the membrane substance. Hence both at the inside and the outside wall of the tubular support, there is membrane substance provided. The membrane substance forms a unitary structure through and within the support.

As to the characteristics of the membrane substance (dope), it is preferable to have a sufficiently high polymer concentration in the dope, so as to increase the dope viscosity. The molecular weight of the polymer is preferably sufficiently high, in order to have a polymer of sufficient mechanical strength. Optionally, the polymer may be cross-linked to increase mechanical strength.

Description of a Preferred Embodiment of the Invention

Manufacturing of Tubular Support Cord by a Knitting Process

By way of example, a knit hollow cord may be manufactured on a machine with individual control of the needles. FIG. 1 represents the "core" unit 10 of the knitting machine. In order to obtain an uninterrupted product in the knitting process, a continuous filament is knit around a cylinder or knitting head 12, which is fixed. At the outer side of head 12 a number of axial grooves are provided. Each groove accepts a needle 11. They are actuated by a cam system 13. The cam system ensures that not all the needles go up or down simultaneously, but the up/downward axial motion resembles a wave-like motion. A fixed thread fence 14 receives the thread and passes it to the needles.

Figure 2A:
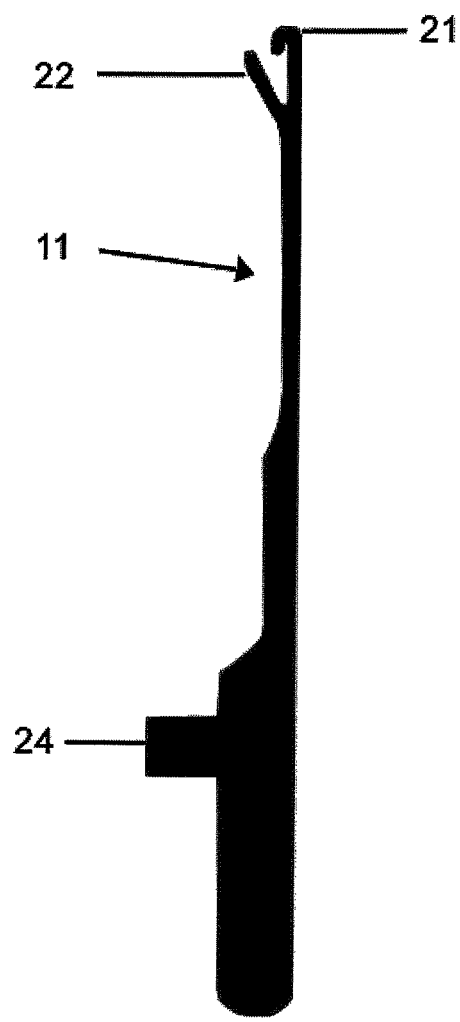
FIG. 2a represents a needle in lateral profile.
Figure 2B:
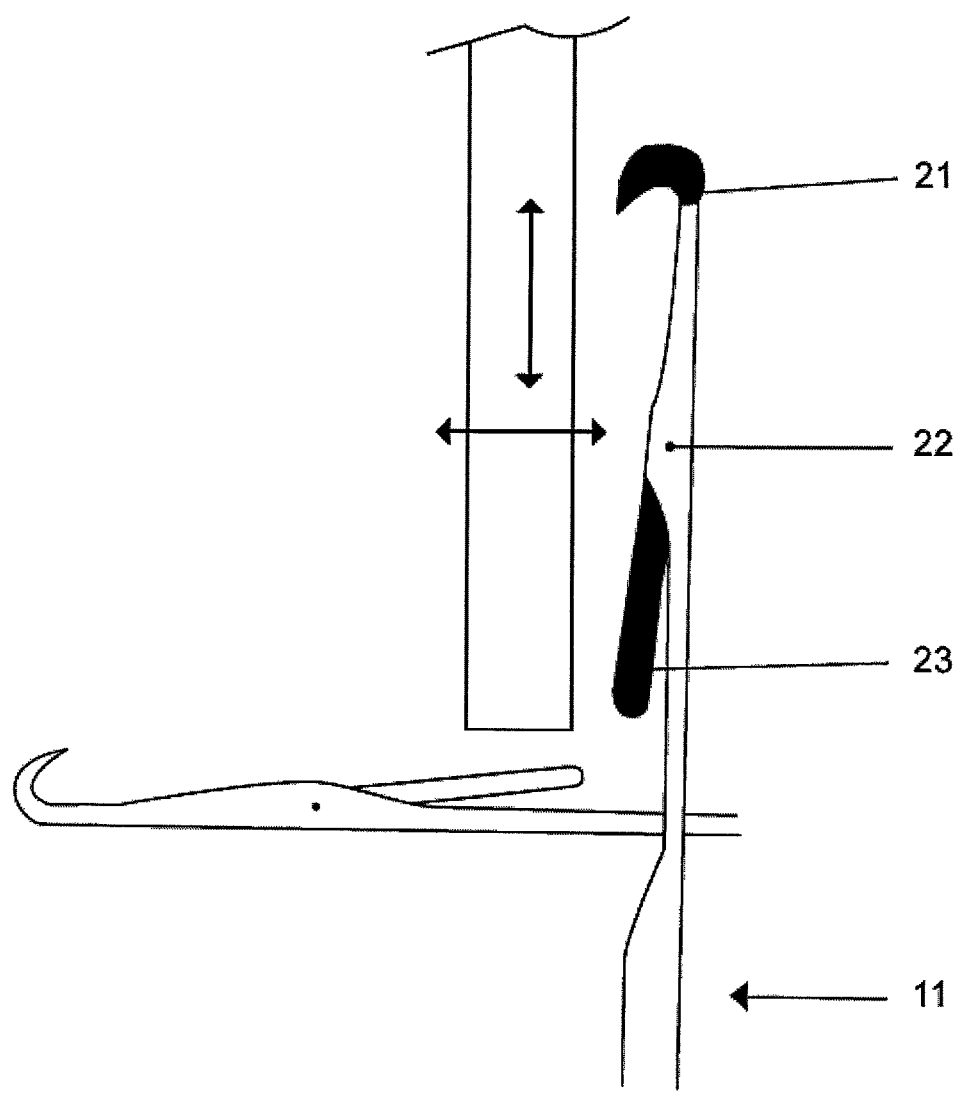
Figure 3A:
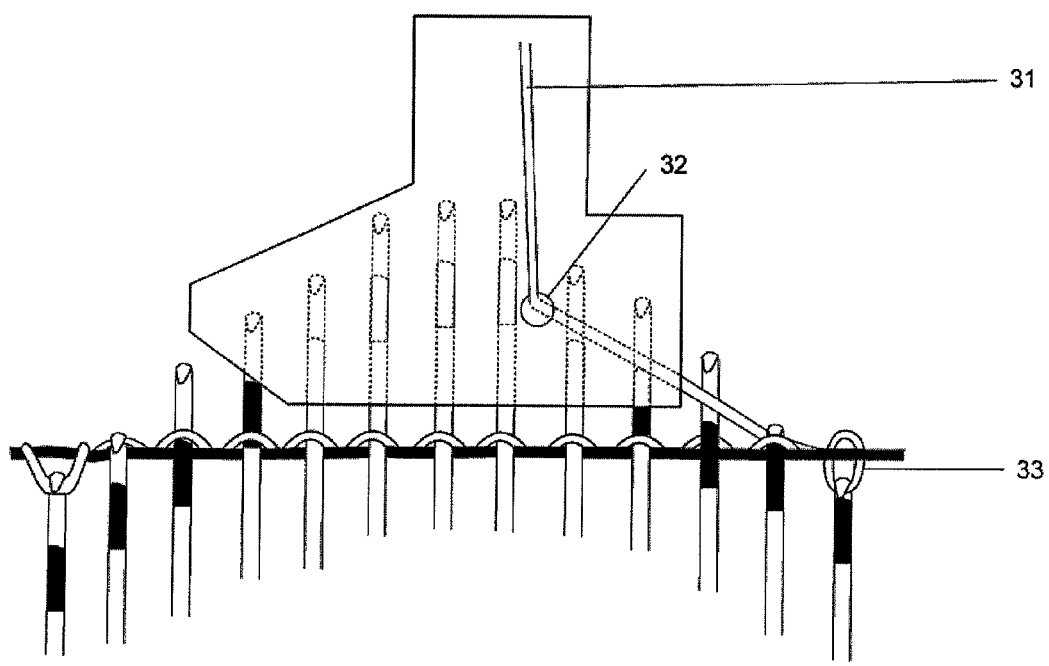
FIGS. 3a and 3b represent the knitting process.
Figure 3B:
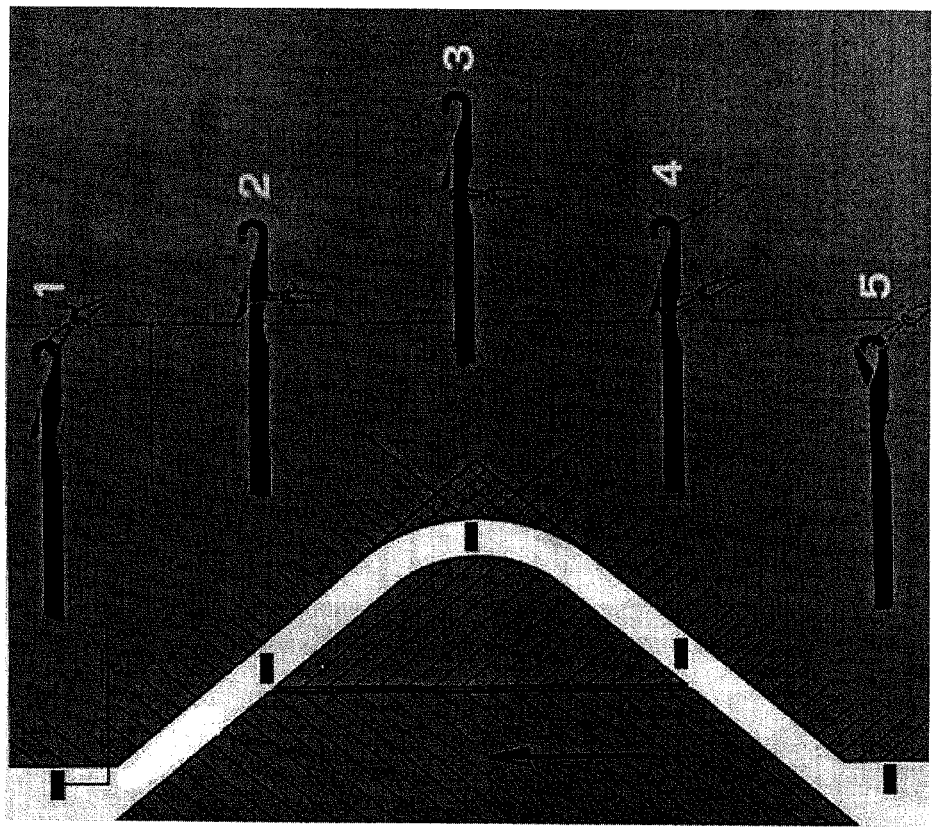

FIGS. 2a and 2b represent the needle 11 in profile. Referring to FIG. 2a, the needles are provided with a protrusion 24, being a follower that engages into the cam 13. Follower 24 enables cam 13 to move the needles vertically (up/down). The needle has a hook 21 for engaging into the thread and a lip 23, able to rotate around a hinge 22. The needles are mounted into head 12 with hook 21 and lip 23 facing outwards. The function of lip 23 becomes clear when looking at FIGS. 3a and 3b. FIG. 3a represents an unfolded view of the needles 11 mounted on the knitting head. The needles describe a waving up/downward motion. The needles to the left of FIGS. 3a and 3b are moving upwards; those to the right are moving downwards. Furthermore, each needle moves in the eye 33 of the stitch it is knitting. When the needle is in its upmost position 3 of FIG. 3b, lip 23 is situated above the stitch eye. During downward motion of the needle, hook 21 engages into the virgin thread at point 32. The stitch eye takes lip 23, as represented in position 4 of FIG. 3b. As lip 23 rotates upwards around hinge 22, it opens the stitch eye and enables hook 21 with the virgin thread to pass through the stitch eye. At the same time, lip 23 closes the hook 21, thereby preventing the virgin thread to escape. At the needle's downmost position, hook 21 still engages the thread, and it will loosen the thread as soon as the upward movement starts. In its upward movement, the needle is surrounded by this new virgin piece of thread which in turn forms a new stitch eye. This new stitch eye will rotate lip 23 downwards thereby opening hook 21, and the process is repeated to make a new stitch. Thread fence 14 ensures that the needles can hook in the thread.

Figure 4:
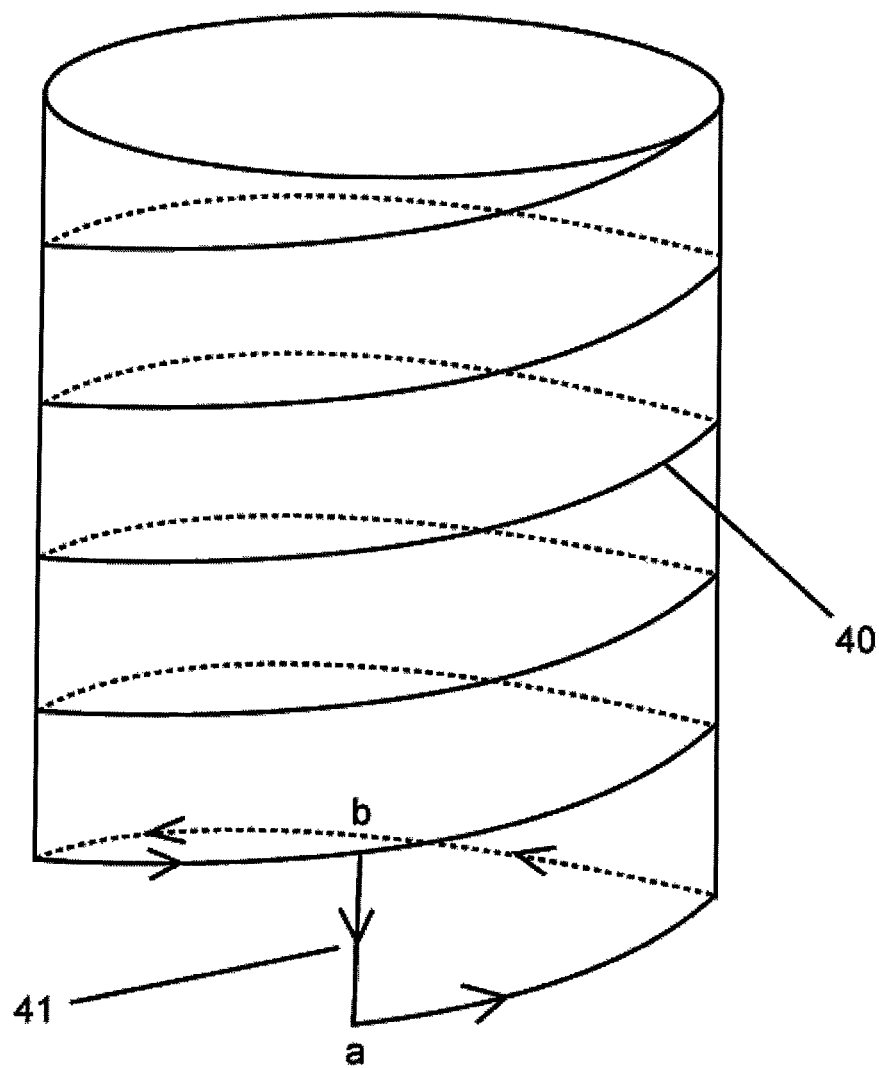
FIG. 4 represents the spirally knit article schematically.

The characteristic of the resulting product is a cord composed of a spirally knit thread, as represented schematically by FIG. 4. This means that the stitches lie along a spiral line 40. The distance 41 between one entire revolution of the spiral line 40 (points a and b on FIG. 4), along which the stitches are knit, is the pitch. The pitch is determined by the speed of evacuating the cord from head 12, the reciprocating frequency of the needles, and the size of the needles. A large pitch results in a more open knit structure—the stitches are located further apart from each other.

Figure 5:
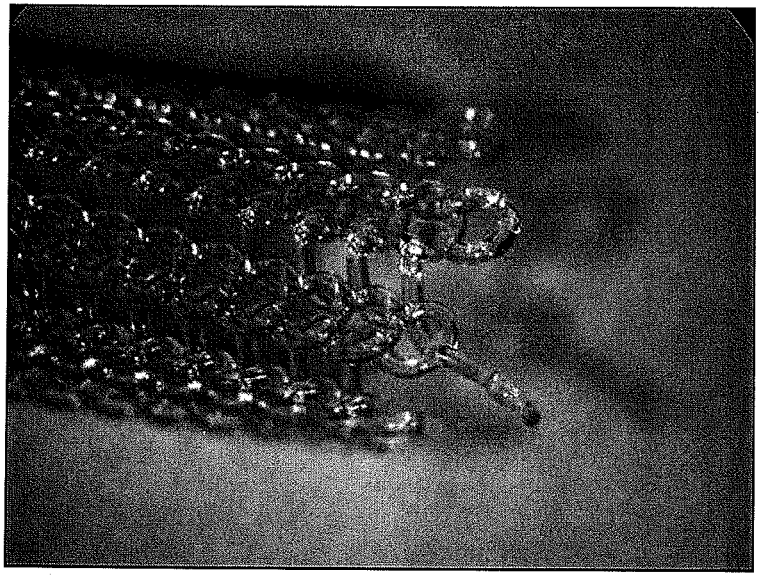
FIG. 5 represents a cord according to the present invention composed of a single spirally knit monofilament thread.
Figure 6:
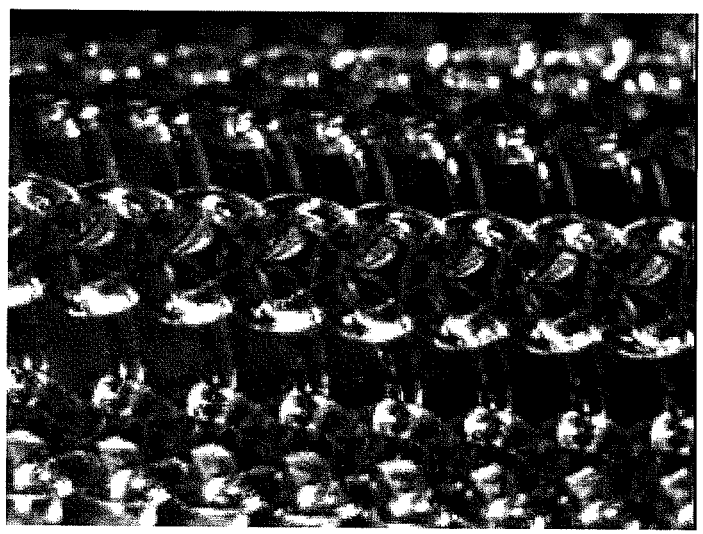
FIG. 6 represents a detail of the fabric of the cord shown in FIG. 5.
Figure 7:
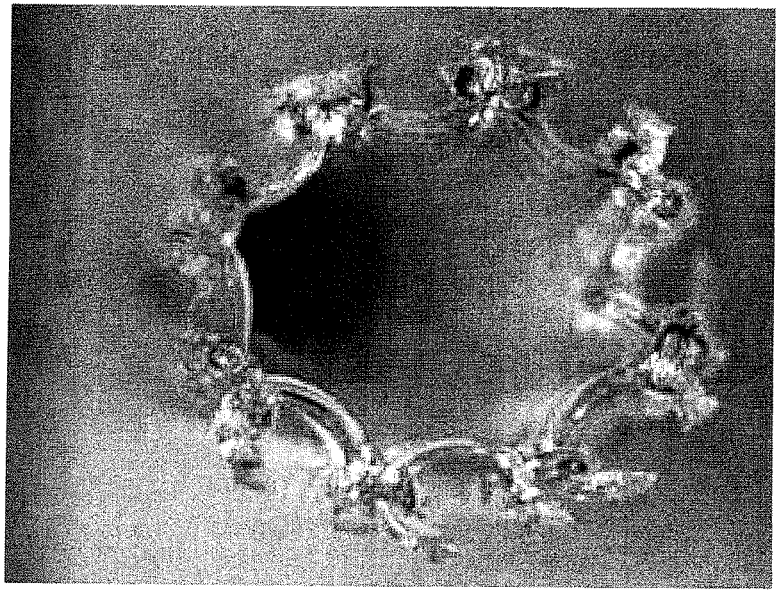
FIG. 7 represents a top view of the article of FIG. 5.

FIGS. 5, 6 and 7 represent a cord manufactured with a monofilament thread, whereby the stitches lie along a spiral line. As apparent from FIG. 7, eight needles have been used to knit this cord and the inner diameter is 5 mm.

The inner diameter or the knit hollow cord is determined by the number of needles used and the diameter of the knitting head. The outer diameter is determined by the diameter and number (one or more) of monofilaments being used.

Figure 8:
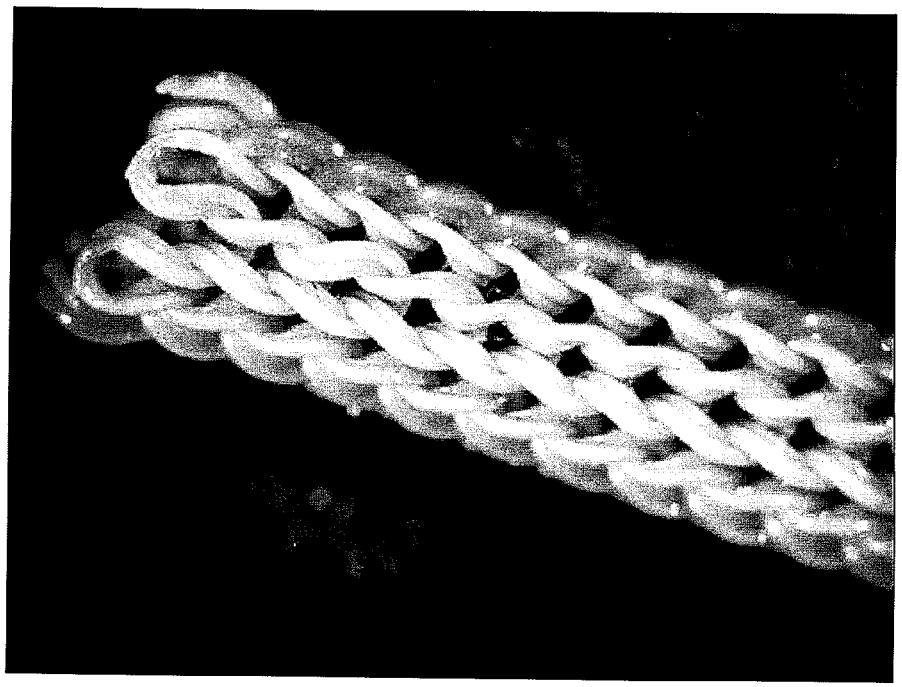
FIG. 8 represents a cord according to the invention comprising two spirally knit monofilament threads.
Figure 9:
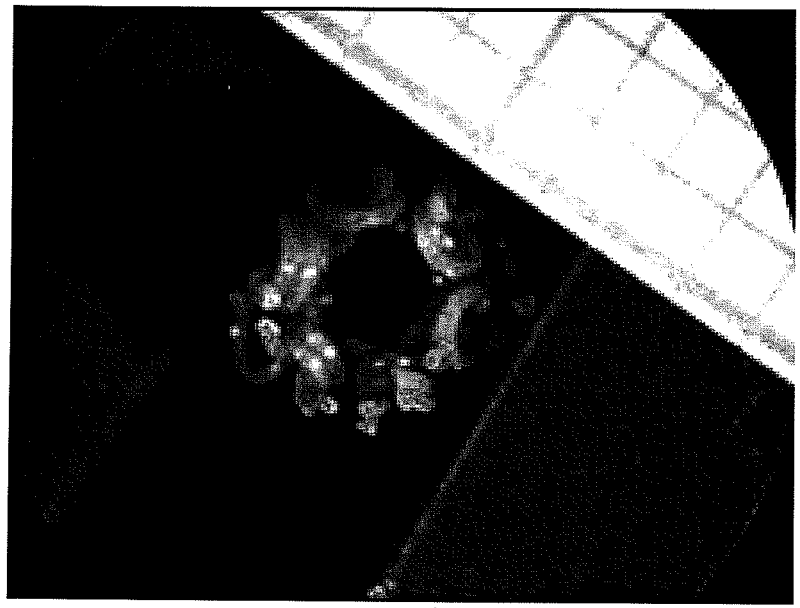
FIG. 9 represents a top view of the article of FIG. 8.

Hence, two or more monofilaments may be used simultaneously in the knitting process. In the latter case, the same manufacturing technique is applied as described hereabove for the single monofilament thread case, with the only difference that two or more monofilament threads are used and stitched simultaneously by the same needle. A cord for which two monofilament threads have been employed is shown in FIGS. 8 and 9. From FIG. 9 it is apparent that six needles have been used to knit this cord. It is important to realise that these threads do not compose a multifilament thread, but remain separate monofilament threads. They are knit and thus bound together in one and the same stitch.

For proper operation, the monofilament thread comes from a flange bobbin, which is installed vertically on a pre-unwinding system. The thread has to be fed tension free, which is performed by a tension controller on top of the machine, resulting in a positive feeding of the thread. This is a prominent production stage which leads to the formation of a cord free of defects.

An additional important aspect is the setout of the cord. This takes place downstream of the machine, preferably after any linking step. The tension of the setout has to be meticulously adjusted in order to ensure that the tubular cord is not compressed. In order to produce a cord of uninterrupted length, a large and lightweight shuttle should be used, at least big enough to take up 5000 to 10000 m.

Circular knit support tubes with an internal diameter of minimum 1.0 mm up to 15 mm can be manufactured starting from one monofilament (polyester, polypropylene, etc.) with a diameter in the range of 0.1 mm to 1.0 mm. The number and size of the needles and the diameter of the knitting head are adapted to the desired internal/external diameter of the cord. The movement of the needles in the knitting machine is individually controlled by the use of a round cam system. The cam box ensures that not all the needles go up or down simultaneously, but move in waves. The speed of rotation can be varied in between 500 and 5000 rpm.

Figure 10:
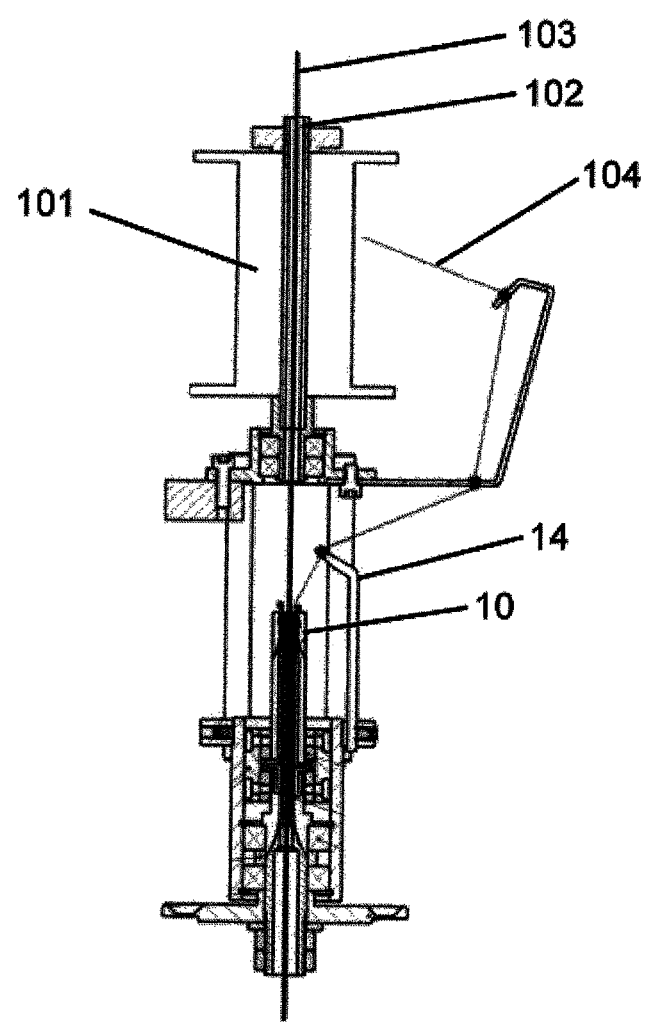
FIG. 10 represents the knitting unit with additional bobbin for insertion of a spiral spring into the knit article.

In a preferred embodiment, a spiral thread may be inserted within the cord. This thread functions within the knit fabric as a kind of spring, preventing the cord from pleating. This spiral spring is manufactured in advance and inserted in the cord during the knitting process. Referring to FIG. 10, the spiral spring 103 is fed through opening 102 to the core unit 10. A bobbin 101 feeds the fibre 104 to be knit to thread fence 14 and core unit 10. The spring does not engage in any of the stitches. The spring thread has preferably a larger diameter than the thread of the fabric and is preferably a monofilament thread, selected from the same group of materials as the threads used for the fabric of the cord. Alternatively, the spring thread can be made of metal.

Examples of Tubular Membranes

Four membranes (#1, #2, #3, #4) were prepared using the manufacturing method of the invention. All four tubular supports are of a knit polyester (PET) monofilament hollow cord. Fourteen needles were used in knitting the tubular supports, but with varying monofilament diameter between the supports (from 0.2 to 0.4 mm, see table 1). Due to the fact that the number of needles was kept constant, the outer diameter of the support remained the same (6.2 mm), whereas the inner diameter decreased for increasing diameter of the monofilament. Only the support of membrane #2 received an epoxy resin coating, which was UV-cured, for linking the engaging parts of the monofilament. The through-openings in the four support cords had sizes in the range between 0.2 and 0.6 mm.

The cord was impregnated with dope in a coating device of the invention in which the diameter of the outlet orifice was 6.5 mm (slightly larger than outer diameter cord) and e.g. for membrane #3 a casting bob was used having an outer diameter of 4.9 mm. All membranes were cut in lengths of 1 meter at a depth of 20 cm below liquid level of the precipitation bath.

Figure 14:
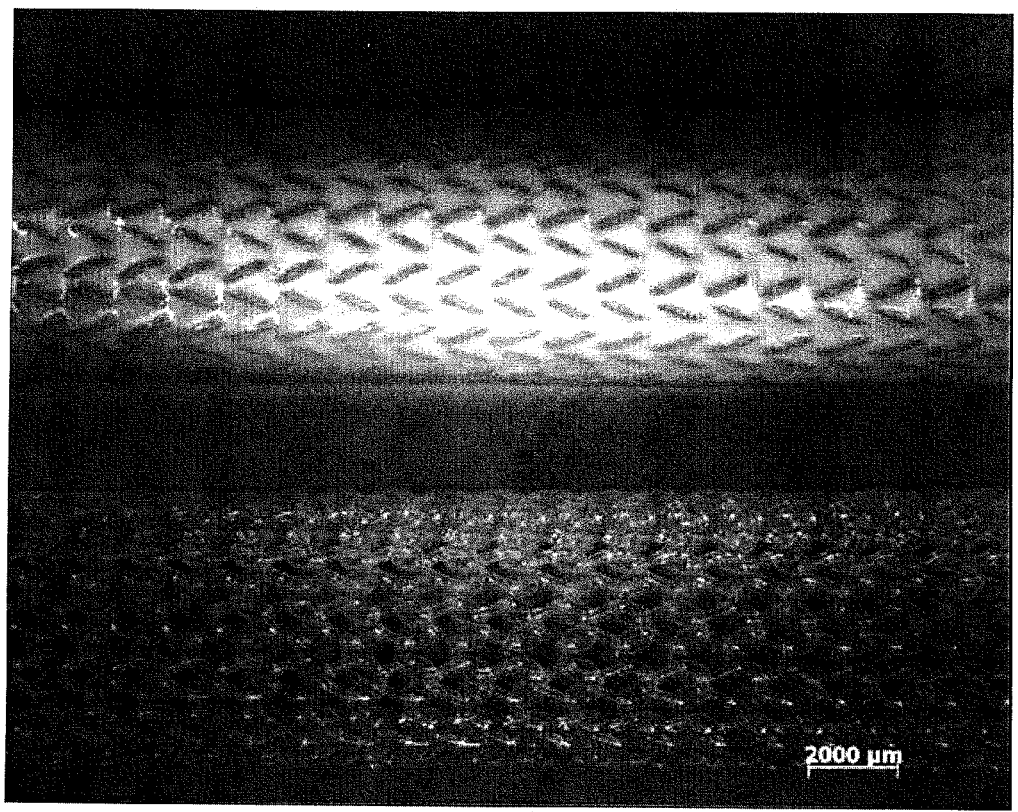
FIG. 14 represents a knit hollow cord (lower article) and the same cord in a reinforced membrane (upper article) according to the invention.
Figure 15:
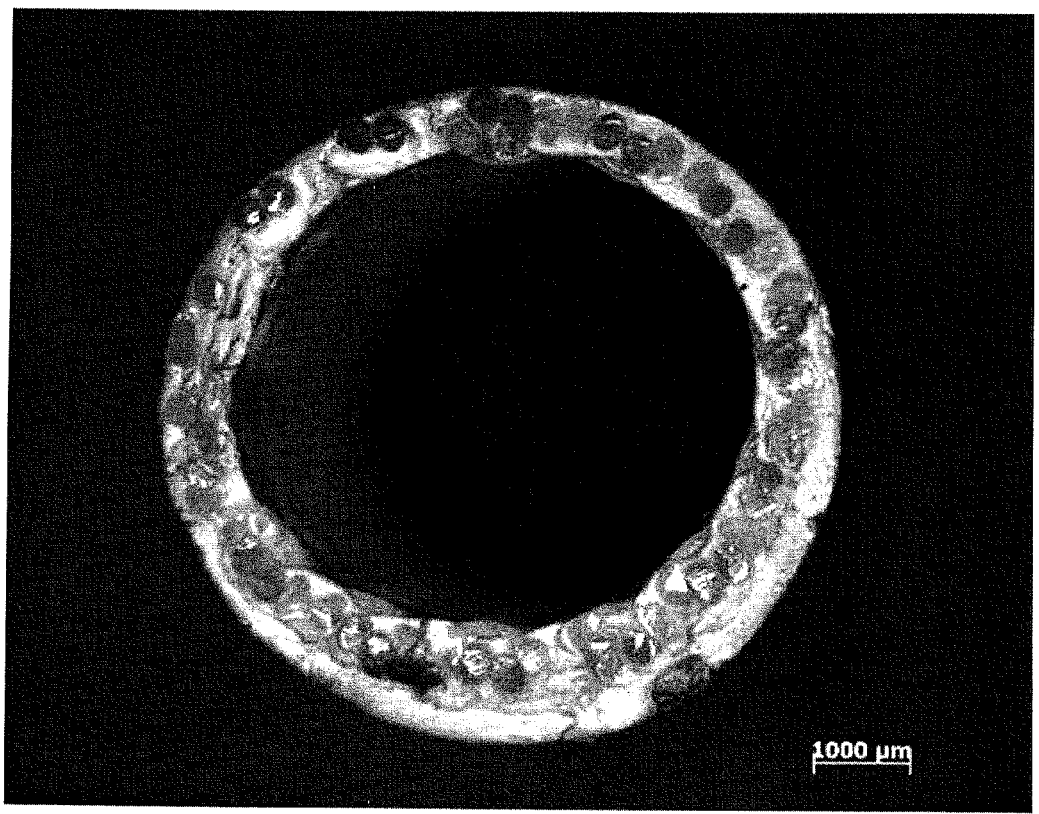
FIG. 15 represents a top view of the upper article of FIG. 14.

A membrane dope solution was prepared, composed of 20 wt % polyethersulphone (type Radel A100®), 10 wt % PVP (type BASF K90®) and 70 wt % NMP. The membrane dope was coated onto the support according to the method of the invention. Coagulation medium was water. FIGS. 14 and 15 show the outer surface and a cross-section of membrane #3.

Figure 16:
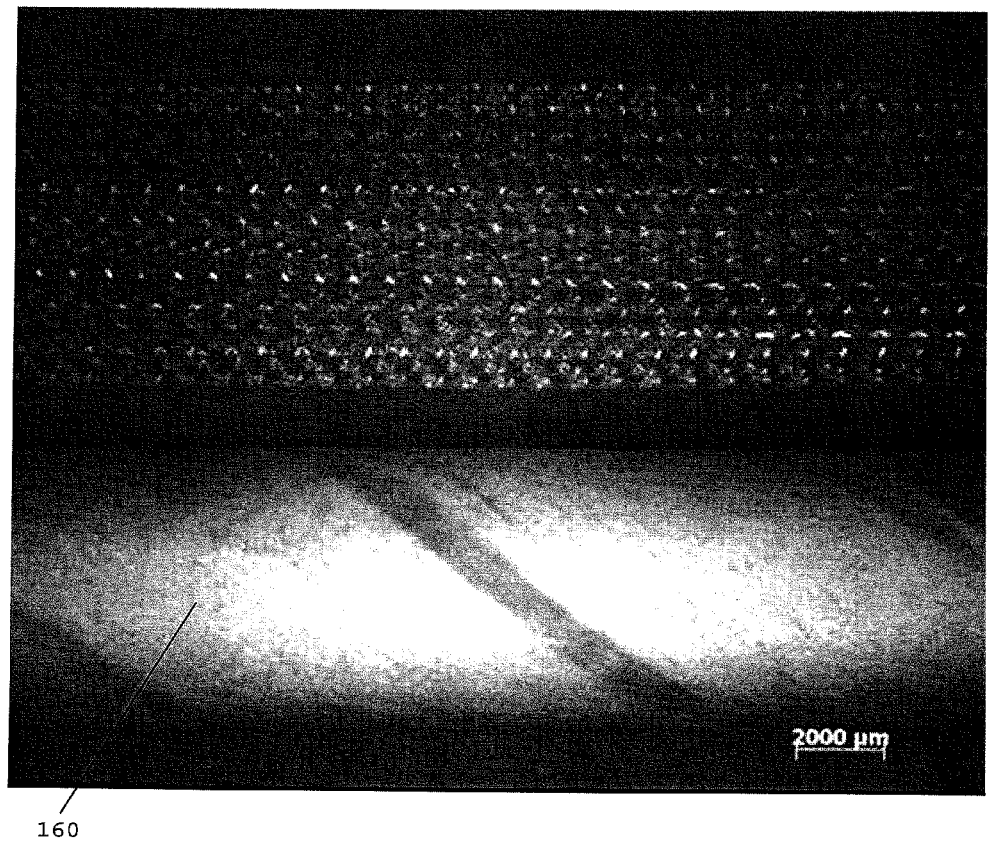
FIG. 16 represents a knit hollow cord (upper article) and a woven and helicoidally welded support for a membrane of the prior art (lower article).

The membranes were tested for mechanical resistance against explosion (by a pressure from the inside) and resistance against a pressure originating from the outside (collapse pressure and membrane detachment pressure). For comparison, also a membrane (#0) supported with welded double-layer polyester support was tested (support 160 of FIG. 16), such a support is described in U.S. Pat. No. 5,034,129.

TABLE 1

Experimental results of mechanical resistance tests for a number of membranes (test results refer to liquid media).

| | | Mechanical resistance | | |
|---|---|---|---|---|
| Membrane | Details of the support | Explosion pressure (bar) | O/i membrane detachment pressure (bar) | Collapse pressure (bar) |
| #0 | Welded PET, double-layer (woven inside/non-woven outside) | >17 | 1 | 2 |
| #1 | Braided PET monofilament (0.2 mm/14 needles) | >17 | >7.5 | 7.5 |

TABLE 1-continued

Experimental results of mechanical resistance tests for a number of membranes (test results refer to liquid media).

| | | Mechanical resistance | | |
| --- | --- | --- | --- | --- |
| Membrane | Details of the support | Explosion pressure (bar) | O/i membrane detachment pressure (bar) | Collapse pressure (bar) |
| #2 | Braided PET monofilament (0.2 mm/14 needles) with epoxy coating | >17 | >10 | 10 |
| #3 | Braided PET monofilament (0.3 mm/14 needles) | >17 | >10 | 10 |
| #4 | Braided PET monofilament (0.4 mm/14 needles) | >17 | >17 | >17 |

From table 1 it is found that all membranes offer excellent resistance against explosion (more than 17 bar), but large differences are found in resistance against pressure from the outside. Prior art membrane #0 already detached starting from 1 bar and the membrane easily collapsed starting from 2 bar, resulting in a poorly back-washable membrane. Membranes #1 to #4 made with a braided monofilament support did not detach from the support at all, even not at their collapse pressure. It is also observed from table 1 that using PET monofilament with larger diameter during the braiding process resulted in higher collapse pressures.

As for the membrane #2 with linked thread, table 1 shows that membrane #2 with linked 0.2 mm diameter thread has a mechanical resistance equivalent to membrane #3 with unlinked 0.3 mm diameter thread (not linked prior to membrane coating), showing the improved backwash-ability of the membranes of the invention.

The membranes according to the present invention are suitable for microfiltration (MF), ultrafiltration (UF), nanofiltration (NF), reverse osmosis (RO), gas separation (GS), membrane distillation (MD), vapour permeation (VP), pervaporation (PV). Such membranes find their application in a lot of sectors, including but not limited to:
    cross-flow external membrane bioreactors (MBRs),
    submerged MBRs.

The invention claimed is:

1. A tubular reinforced polymeric filtration membrane comprising:
    a tubular support which is seamless and made of monofilament thread, the tubular support including through-openings: and
    a porous membrane substance allowing filtration through the porous membrane substance;
    wherein:
        the tubular support is embedded in the membrane substance,
        the porous membrane substance is present both at an inner wall and an outer wall of the tubular support and completely fills said through-openings, wherein the inner wall and outer wall of the tubular polymeric membrane are smooth; and
        the tubular membrane has a constant inner diameter and a constant outer diameter.

2. The tubular polymeric membrane according to claim 1, wherein the through-openings have a size larger than or equal to 0.1 mm.

3. The tubular polymeric membrane according to claim 1, wherein parts of the monofilament thread that engage and/or touch are linked by other means than the membrance substance and in addition to the membrane substance.

4. The tubular reinforced membrane according to claim 3, wherein said parts of the monofilament thread that engage and/or touch are linked by cured or hardened resin.

5. The tubular polymeric membrane according to claim 3, wherein said tubular support comprises loops of monofilament thread and adjacent and/or engaging loops are linked.

6. The tubular reinforced membrane according to claim 5, wherein said tubular support is knit or crocheted.

7. The tubular reinforced membrane according to claim 1, wherein said monofilament thread is selected from the group consisting of polyester, polyamide, polyethylene, polypropylene, polyetherketone, polyetheretherketone and polyphenylenesulfide.

8. The tubular reinforced membrane according to claim 1, having an outer diameter equal to the outer diameter of the tubular support.

9. The tubular reinforced membrane according to claim 1, having an inner diameter equal to the inner diameter of the tubular support.

10. The tubular reinforced membrane according to claim 1, comprising a spiral thread inside of the tubular support, the spiral thread embedded in the membrane substance.

11. The tubular reinforced membrane according to claim 1, wherein the membrane has and internal diameter between 1 and 25 mm.

12. The tubular reinforced membrane according to claim 1, wherein the membrane is made from a method comprising the steps of:
    manufacturing the seamless porous tubular support from the monofilament thread,
    impregnating the tubular support with a polymeric solution to obtain an impregnated tubular support, whereby the polymeric solution is fed from outside of the support and wherein inner lumen of the tubular support at least partially tills with the polymeric solution,
    adjusting an inner diameter of the impregnated tubular support comprising passing the impregnated tubular support through an orifice to obtain a smooth outer wall,
    adjusting an outer diameter of the impregnated tubular support comprising passing the impregnated tubular support thorough an orifice to obtain a smooth outer wall, and
    immersing the impregnated tubular support in a precipitation bath to coagulate the polymeric solution and form the porous membrane substance to obtain the tubular reinforced membrane.

13. The tubular reinforced membrane according to claim 12, wherein the membrane is made from a method comprising the further step of cutting the impregnated tubular support while it is immersed in the precipitation bath.

14. The tubular reinforced membrane according to claim 12, wherein the impregnating step comprises completely filling the inner lumen of the tubular support with the polymeric solution.

15. The tubular reinforced membrane according to claim 12, wherein the manufacturing step comprises linking parts of said monofilament thread which engage and/or touch, and wherein the step of linking parts of the monofilament thread comprises thermo-fixating said parts.

16. The tubular reinforced membrane according to claim 12, wherein the manufacturing step comprises linking parts of said monofilament thread which engage and/or touch, and wherein the step of linking parts of the monofilament thread comprises coating the support with a resin and UV-curing, the resin or hardening the resin with a hardening accelerator.

17. The tubular reinforced membrane according to claim 12, wherein in the impregnating step the polymeric solution has a viscosity in the range between 0.5 Pa.s and 500 Pa.s.

18. The tubular reinforced polymeric filtration membrane according to claim 1, wherein the porous membrane substance comprises one or more of: polyethersulfone, polyvinylpyrrolidone, polysulfone, polyacrylonitrile, polyvinylalcohol, polyvinylacetate and polyvinylchloride, 19. The tubular reinforced polymeric filtration membrane according to claim 1, wherein the filtration membrane is a microfiltration, or a ultrafiltration, or a nanofiltration membrane.

20. The tubular reinforced polyrneric filtration membrane according to claim 1, wherein the filtration membrane is a reverse osmosis membrane, a gas separation membrane, a distillation membrane, a vapor permeation membrane, or a pervaporation membrane.

21. The tubular reinforced polymeric filtration membrane according to claim 1, wherein the membrane has an explosion pressure greater than 17 bar, and the membrane has an outside to inside membrane detachment pressure greater than 7.5 bar, and the membrane has a collapse pressure of at least 7.5 bar in liquid media.

* * * * *